June 23, 1970 K. ABEL 3,517,209

PARAMETRIC AMPLIFIER WITH INDEPENDENT TERMINAL IMPEDANCES

Original Filed June 3, 1960

3 Sheets-Sheet 1

INVENTOR
KONRAD ABEL

BY Hill, Sherman, Meroni, Gross & Simpson

ATTORNEYS

PARAMETRIC AMPLIFIER WITH INDEPENDENT TERMINAL IMPEDANCES

Original Filed June 3, 1960

INVENTOR
KONRAD ABEL

BY Hill, Sherman, Meroni, Gross & Simpson

ATTORNEYS

INVENTOR
KONRAD ABEL
BY Hill, Sherman, Meroni, Gross & Simpson
ATTORNEYS

United States Patent Office 3,517,209
Patented June 23, 1970

3,517,209

PARAMETRIC AMPLIFIER WITH INDEPENDENT TERMINAL IMPEDANCES

Konrad Abel, Munich, Germany, assignor to Siemens Aktiengesellschaft, Munich, Germany, a corporation of Germany Continuation of application Ser. No. 33,837, June 3, 1960. This application Aug. 24, 1966, Ser. No. 574,817
Claims priority, application Germany, June 9, 1959, S 63,372
Int. Cl. H03f *7/02, 7/04;* H03c *3/18*
U.S. Cl. 307—88.3 9 Claims

ABSTRACT OF THE DISCLOSURE

A parametric amplifier with four energy paths branching from a non-linear capacitance for pump energy $f_0$, signal energy $f_1$, lower side band energy $f_2$ ($f_0$ minus $f_1$), and upper side band energy $f_3$ ($f_0$ plus $f_1$), respectively; with active conductance values $G_1$, $G_2$ and $G_3$ in the branches for frequencies $f_1$, $f_2$ and $f_3$, respectively, having definite values correlated to provide desired output characteristics at $f_2$ or $f_3$; or alternatively, three branching energy paths, one branch presenting for example, a definite conductance value $G_3$ at frequency $f_3$ and also having a line section transforming the conductance to a definite value $G_2$ for the frequency $f_2$ which is correlated with the values $G_1$ and $G_3$ to provide an amplification substantially greater than $f_3/f_1$.

CROSS REFERENCE TO RELATED APPLICATION

The present application is a continuation of Ser. No. 33,837 filed June 3, 1960, now abandoned.

This invention is concerned with an arrangement for low noise level amplification of short and ultra short electromagnetic waves, utilizing a reactance modulator the output of which contains a terminal impedance for the band taken off as a working oscillation, especially the upper side band, as well as for the lower side band.

Amplifiers of the above indicated kind which are known, for example, from "Proceedings of the IRE," June 1958, p. 1301 to 1303, comprise a modulator with a non-linear reactance, to which are conducted the waves which are to be amplified as well as a superimposing oscillation of higher frequency. Owing to the nonlinearity of the reactance which consists, for example, of a crystal diode operated in the blocking range and acting as a capacitance, there appear side bands lying above and below the superimposed frequency. An attenuation reduction of the modulator input is effected, for the frequencies lying below the superimposed oscillation, by terminal means of the reactance modulator containing a resistive component of the impedance. The modulator then acts like a negative resistance and can thus be used in known manner in conjunction with a circulator for the amplification of waves. Such amplifier can also be used with the output of the reactance modulator connected with a receiver over a directional line and a band filter for filtering out the upper side band. A drawback of known arrangements of this kind resides in considerable narrowing of the band width, appearing in operation when noticeable amplification is to be obtained.

The object of the invention is to show a way which makes it possible to overcome these difficulties in simple manner.

This object is according to the invention realized, in connection with low noise level amplification of short and ultra short electromagnetic waves, employing a reactance modulator containing a terminal impedance for the side band taken off as working oscillation, as for example, the upper side band, by the provision of a terminal impedance for the respective other side band, which is with respect to its real component (ohmic resistance) selectable independent of the terminal impedance of the side band serving as working oscillation. The value of the real component of the terminal impedance for the respective other side band is thereby made so great that the amplification reaches with given band width its maximum value. It is also recommended to make the real component of the terminal impedance for the respective other side band so great that the input conductance value of the reactance modulator has for the signal oscillation a predetermined prescribed value which may be positive or negative. It has been found advantageous to separate the two side bands by separating filter means or by a bridge circuit. An equivalent result may be obtained by providing for the two side bands a common terminal impedance but inserting in the connecting line between the output of the reactance modulator and the terminal impedance a transformation device which acts selectively with respect to the other side band.

The various objects and features of the invention will appear from the description which will be rendered below with reference to the accompanying drawings showing essential details of some embodiments.

Figure 1:
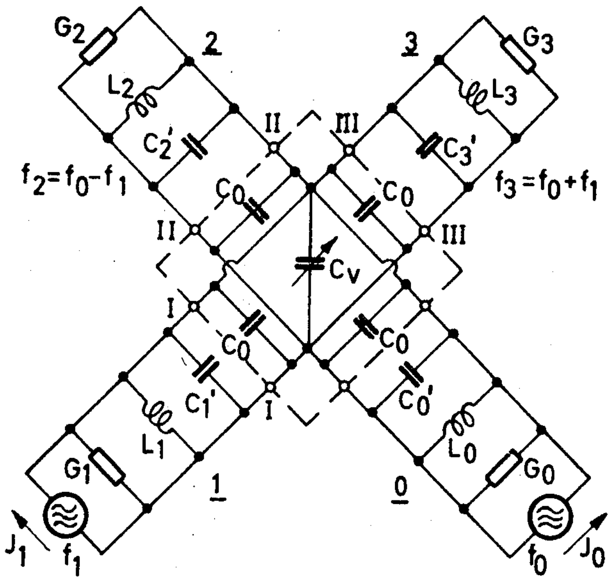
FIG. 1 shows a substitution circuit of a parametric amplifier with a non-linear capacitance as a non-linear reactance, on which the explanations relating to the invention are based.

Referring to FIG. 1, $C_0$ and $C_V$ indicate the electrical values formed by the non-linear capacity. A distinction is thereby made between the average capacity $C_0$ and $C_V$, the latter constituting the alteration of the average capacity which is effected by the alternating voltages. In the polynome describing the characteristic capacity line, $C_0$ accordingly corresponds to the constant initial member while $C_V$ is determined by further members of higher order of the polynome. For the sake of clarity, the nonlinear reactance is in the substitution circuit outlined by dash lines. Four branches are connected parallel to this non-linear reactance, such branches being indicated by numerals 0, 1, 2 and 3. The branch 0 serves for supplying the energy of the pump oscillator with the frequency $f_0$, which consists of the generator conductance value $G_0$ and the current source $J_0$. The branch 1 supplies the energy of the signal source with the frequency $f_1$. The signal source includes the generator conductance value $G_1$ and the signal current source $J_1 \cdot L_0$, $C_0'$, and $L_1$, $C_1'$ are the input circuits for the oscillator frequency and for the signal frequency connected to the input in the respective branches. The branch 2 represents the output impedance which is being offered to the lower side band, and branch 3 is the output impedance which is being offered to the upper side band. Each of these branches includes a circuit L, C, serving for tuning out the reactance component, and an operating or active conductance value G which is in the substitution circuit indicated with the index of the respective branch. Accordingly, in the present case, the lower side band with the frequency $f_2=f_0-f_1$ is obtained at the branch 2, and the upper side band with the frequency $f_3=f_0+f_1$ is obtained at the branch 3. It is assumed in the further discussion, that means are provided to assure that the energy obtaining in each branch has the frequency intended for the respective branch. This means, in other words, that none of the branches shall disturb any of the three remaining branches.

Figure 2:
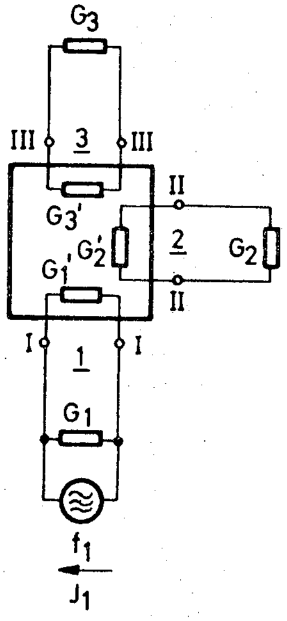
FIG. 2 is a substitution circuit to aid in explaining the amplification effected in the arrangement according to FIG. 1.

The behavior of such an arrangement may be described as follows: The consequence of the effective conductivity value $G_2$ in the branch 2 is that an input impedance will appear at the input terminals I of the parametric amplifier, to which $G_2$ contributes a negative resistive component as a part thereof, while $G_3$ will yield a positive resistive component. Accordingly, a desired positive or negative resistive component may be compelled to appear as an input resistive component of the impedance at the terminals I of the parametric amplifier, by mutual tuning of $G_2$ and $G_3$. The amplification of the arrangement may be influenced as described below, assuming that the substitution circuit according to FIG. 2, is substituted, in which $G_1'$, $G_2'$, $G_3'$ indicate the input impedances of the parametric amplifier as seen from the respective terminals. This substitution circuit is simplified as branch 0 for the connection of the oscillator energy has been omitted, only the resistive components of the respective input impedances being considered. It is assumed, for the sake of simplifying the considerations, that the characteristic charge curve has in the working range of the non-linear reactance a quadratic course, despite the fact that the explained general rules are also valid for other characteristic curve forms. The following relation between the individual resistive components may then be ascertained:

$$G'_1/G_1=m_{13}-m_{12}$$

$$G'_2/G_2=m_{12}/(1+m_{13})$$

$$G'_3/G_3=m_{13}/(1-m_{12})$$

wherein $$m_{12}=\omega_1\cdot\omega_2\cdot C_1^2/(G_1\cdot G_2)$$

and $$m_{13}=\omega_1\cdot\omega_3\cdot C_1^2(G_1\cdot G_3)$$

$C_1$ is thereby equivalent to $C_V$ mentioned in connection with the substitution circuit according to FIG. 1, because of the assumed quadratic characteristic curve in the working range. If $V_{13}$ designates the output amplification from the signal input I to the signal output III, there will be obtained $$V_{13}=\frac{f_3\cdot 4\cdot m_{13}}{f_1\cdot(1+m_{13}-m_{12})^2}$$

Figure 3:
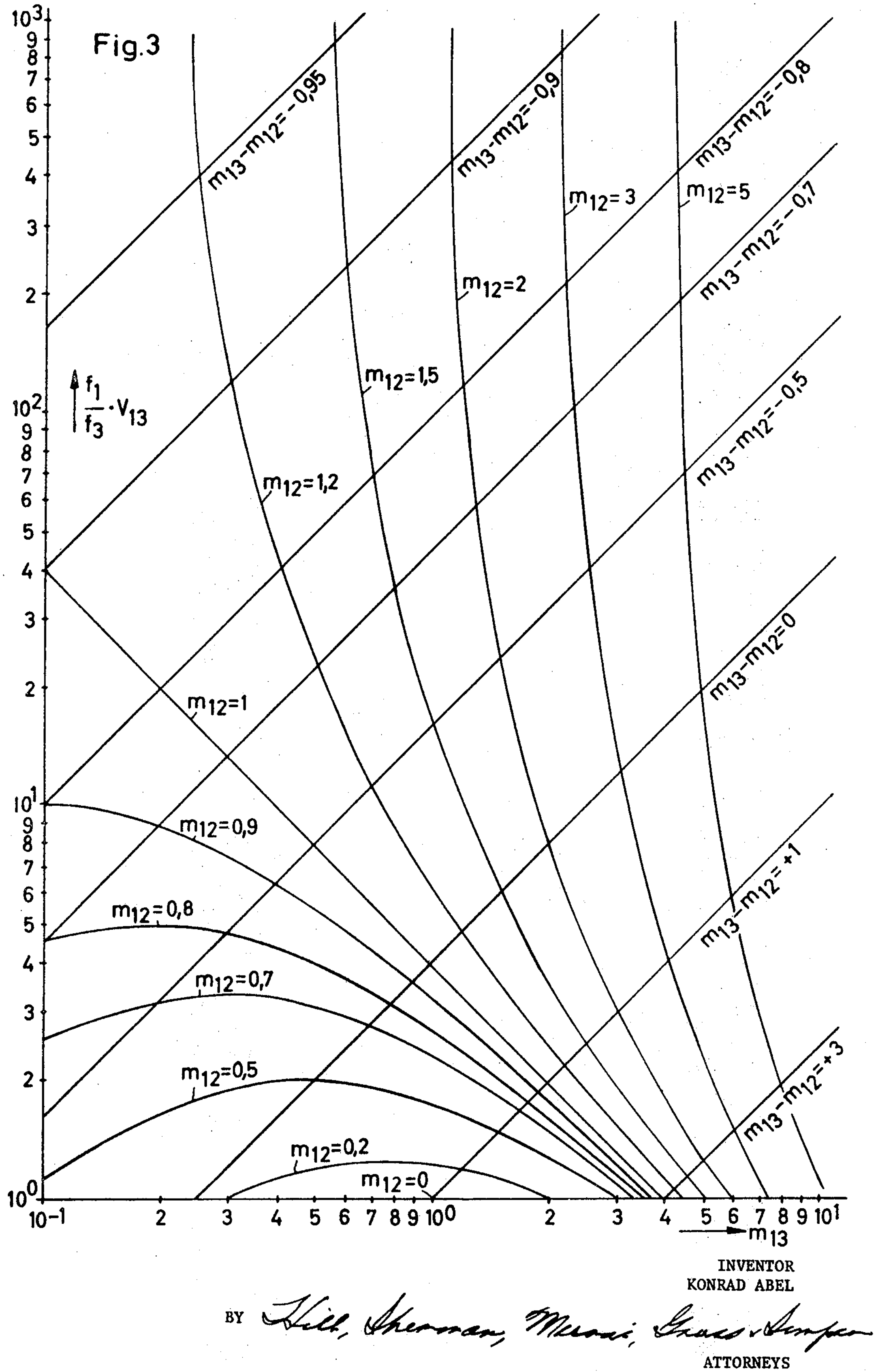
FIGS. 3 and 4 illustrate the operation of the parametric amplifier.

The operation of the parametric amplifier resulting from these equations is represented in FIG. 3. If $G_2$ is, corresponding to the known case, assumed to be infinite, the amplification of the parametric amplifier will be equal to the ratio $f_3/f_1$. However, as soon as $G_2$ assumes a definite value, $G_3$ will enter into the amplification. From the equations may generally be derived the rule, namely, that the amplification for $f_3$ is the greater, the more $G_2$ is involved in the energy consumption. For a given $G_2$, the amplification will moreover be the greater, the lower $G_3$. Appropriate selection of $G_2$ and $G_3$ accordingly permits to realize a predetermined amplification value in stable condition. The stability condition of such an amplifier requires that $m_{13}-m_{12}$ must be greater than $-1$. The difference $m_{13}-m_{12}$ thereby signifies the normalized input resistive component $G'_1/G_1$ of the parametric amplifier. There are in FIG. 3 two parameters, namely, the difference $m_{13}-m_{12}$ corresponding to the normalized input resistive component $G'_1/G_1$ of the parametric amplifier, and the value $m_{12}$. It is in this manner possible to determine the amplification either by selection of $m_{13}$ or $m_{12}$, proceeding from the input resistive component, or directly by selection of $m_{12}$ and $m_{13}$. The value $m_{12}=0$, indicated in FIG. 3, corresponds to the known case according to which $G_{12}=\infty$, the amplification depending solely upon the ratio of $f_3$ to $f_1$.

In the case of using as a signal output the lower side band, that is, $f_2$, there will be obtained for the output amplification $V_{12}$ of the signal, the equation $$V_{12}=\frac{f_2\cdot 4\cdot m_{12}}{f_1\cdot(1+m_{13}-m_{12})^2}$$

Figure 4:
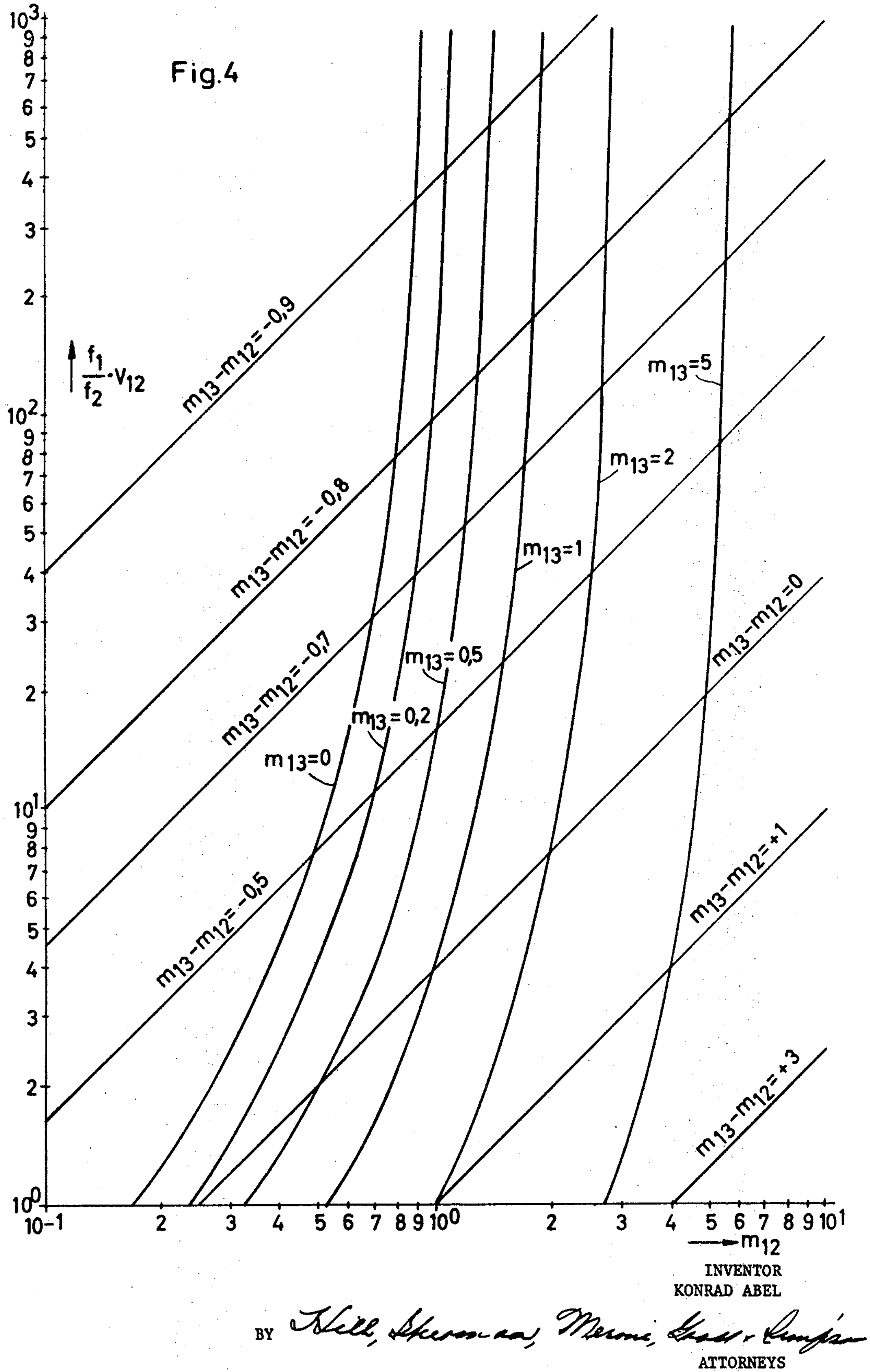

The behavior of the parametric amplifier described by this equation, in this manner of circuiting, is represented in FIG. 4. It may be said with respect to this case that the amplification is somewhat reduced by the participation of $G_3$ in the energy consumption, but that the band width is increased for a desired amplification.

It shall now be explained how the separation for the frequencies $f_2$ and $f_3$ can be effected in practice in an individual case. It is to be observed thereby that $f_2$ and $f_3$ shall not merely be individual frequencies but shall have, on account of the finite band width of the signals with the frequency $f_1$, also a finite band width.

Figure 5:
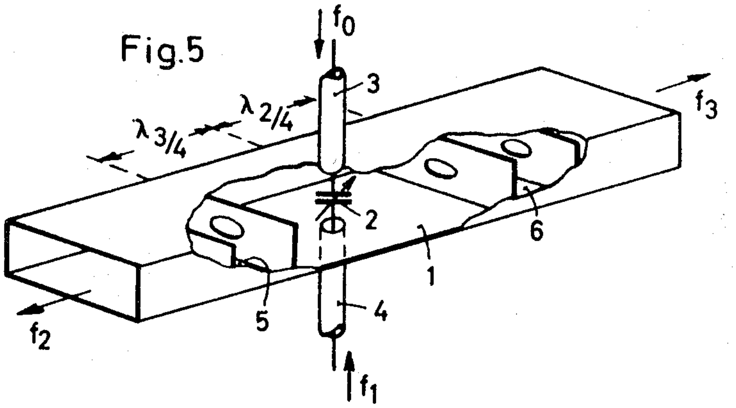
FIG. 5 represents a separating filter for operating frequencies.

FIG. 5 shows an embodiment comprising a filter arrangement for separating the frequencies $f_2$ and $f_3$. In a cross-sectional rectangular wave guide 1 there is in known manner inserted a crystal diode 2, as a non-linear reactance, between the oppositely extending wide or broad wave guide sides. The connection of the high frequency voltages with the frequencies $f_0$ and $f_1$ is effected over two coaxial lines 3 and 4 in the form of a series feed-in. A first filter 5 is disposed in the wave guide, at a spacing of one fourth and the wave guide wave length at a frequency $f_3$, as calculated from the cross-sectional plane in which is connected the non-linear reactance 2, such filter being conductive only for the frequency $f_2$ and forming with its input aperture a shunt for the frequency $f_3$. A filter 6 is in similar manner provided in the other section of the wave guide, which is permeable for the frequency $f_3$ and constitutes a shunt for the frequency $f_2$ in a spacing of one fourth of the wave guide wave length at the frequency $f_2$, as calculated from the input plane of the non-linear reactance. The arrangement accordingly operates so that, as seen from the central section of the wave guide 1, only the energy with the frequency $f_2$ can be propagated in one direction, while only the energy with the frequency $f_3$ can be propagated in the other direction. It is accordingly possible to treat the individual energy portions separately by absorber means or further filters, in the manner described before.

Figure 6:
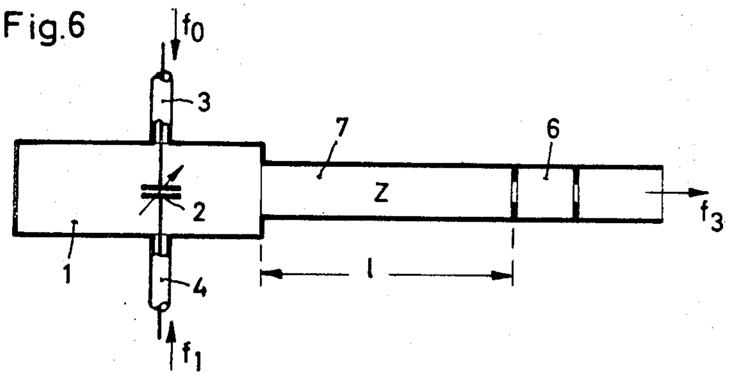
FIG. 6 shows an example making use of frequency-selective transformation properties of a line section.

FIG. 6 shows an example making use of frequency selective transformation properties of a line section. The basic concept of the arrangement corresponds approximately to that of FIG. 5 and parts corresponding to those in the latter figure are therefore identically referenced. In FIG. 6, however, only three energy paths branch from the non-linear reactance provided by diode 2. (In FIG. 5 four energy paths branch from the non-linear reactance.) The line section 7 serving for the frequency selective transformation differs in its length 1 and in its wave resistance Z from the sections adjacent thereto, such that the successively disposed filter 6 for the frequency $f_3$ is transformed into the switching-in plane for the frequency $f_2$, with respect to its input impedance for the frequency $f_2$, that a desired effective conductance value will appear there for the frequency $f_2$.

The field of application of a parametric amplifier is relatively wide. Thus, a parametric amplifier according to the invention can be employed, among others, as a device for transposing a high frequency oscillation lying in a relatively low frequency position, into a higher frequency position. The corresponding frequency converter may be one serving as a transmitter converter, for example, in a relay station of a directional wireless channel, which shall give off a relatively high output energy. The invention is also adapted for use in connection with an amplifier for a received signal, for example, for placing a received signal into a higher frequency position and amplifying it, so that it may be in this higher frequency position in customary manner further processed, for example, demodulated. The advantage resides thereby in the fact that the amplification is effected with a low noise level and that it can be adjusted by the selection of $G_2$ and $G_3$, in accordance with a given value which may in some situations lie considerably above the value resulting from the ratio of output signal frequency to input signal frequency.

Changes may be made within the scope and spirit of the appended claims which define what is believed to be new and desired to have protected by Letters Patent.

I claim:

1. An arrangement for low noise level amplification of short and ultra short electromagnetic waves, comprising (a) a reactance modulator comprising a non-linear capacitance, (b) a pump frequency energy path connected with said non-linear capacitance for supply thereto of pump energy of a frequency $f_0$ to provide a capacitance value of said nonlinear capacitance including a constant capacitance value $C_0$, and a variable capacitance value $C_V$ varying as a function of the pump energy, (c) a signal frequency energy path connected with said non-linear capacitance for supplying energy of an input signal oscilation of frequency $f_1$ to said non-linear capacitance to generate a lower side band of frequency $f_2$ equal to $f_0$ minus $f_1$, and to generate an upper side band of frequency $f_3$ equal to $f_0$ plus $f_1$, said signal frequency energy path having a conductance value $G_1$, (d) an upper side band energy path connected with said non-linear capacitance and having means for transmitting said upper side band of frequency $f_3$, said upper side band energy path having a conductance value $G_3$, and (e) a lower side band energy path connected with said non-linear capacitance, and having means for transmitting said lower side band of frequency $f_2$, said lower side band energy path having a conductance value $G_2$, (f) the output amplification $V_{13}$ with respect to energy of frequency $f_3$ of said upper side band energy path in relation to the energy of the input signal oscillation of frequency $f_1$ at said signal frequency energy path having a value according to the following formula:

$$V_{13}=\frac{f_3 \cdot 4 \cdot m_{13}}{f_1 \cdot (1+m_{13}-m_{12})^2}$$

with $$m_{12}=\omega_1 \cdot \omega_2 \cdot C_V^2/(G_1 \cdot G_2)$$
$$m_{13}=\omega_1 \cdot \omega_3 \cdot C_V^2/(G_1 \cdot G_3)$$

and $$\omega_1=2\pi f_1,\ \omega_2=2\pi f_2,\ \omega_3=2\pi f_3$$

(g) said conductance values $G_1$, $G_2$ and $G_3$ each having a definite finite value greater than zero, and said conductance values $G_1$, $G_2$ and $G_3$ being correlated with each other to provide a predetermined amplification $V_{13}$ substantially greater than $f_3/f_1$.

2. An arrangement according to claim 1 with said upper and lower sideband branch energy paths comprising a hollow conductor with rectangular cross section having said reactance modulator arranged between the broad sides of said hollow conductor, said pump frequency branch energy path comprising a coaxial conduit connecting with said reactance modulator through one broad side of said hollow conductor, said signal frequency branch energy path comprising a further coaxial conduit connecting with said reactance modulator through the other broad side of said hollow conductor, and separating means connected with the upper side band branch energy path for blocking transmission of the lower side band of frequency $f_2$, and separating means connected with the lower side band branch energy path for blocking transmission of the upper side band of frequency $f_3$, said separating means comprising a first filter in said upper side band branch energy path allowing passage to the frequency $f_3$ and having an input baffle providing a short circuit for the frequency $f_2$ and being disposed from the cross-sectional plane of said reactance modulator a distance of substantially one quarter of the wave length of the hollow conductor at frequency $f_2$, and a second filter in said lower side band branch energy path allowing passage to the frequency $f_2$ and having an input baffle providing a short circuit for the frequency $f_3$ and being disposed a distance from said cross-sectional plane in an opposite direction in said hollow conductor substantially equal to one quarter of the wave length of the hollow conductor at frequency $f_3$.

3. An arrangement for low noise level amplification of short and ultra short electromagnetic waves, comprising (a) a reactance modulator comprising a non-linear capacitance, (b) a pump frequency energy path connetced with said non-linear capacitance for supplying thereto pump energy of a frequency $f_0$ to provide a capacitance value of said non-linear capacitance including a constant capacitance value $C_0$, and a variable capacitance value $C_V$ varying as a function of the pump energy, (c) a signal frequency energy path connected with said non-linear capacitance for supplying energy of an input signal oscillation of frequency $f_1$ to said non-linear capacitance to generate a lower side band of frequency $f_2$ equal to $f_0$ minus $f_1$, and to generate an upper side band of frequency $f_3$ equal to $f_0$ plus $f_1$, said signal frequency energy path having a conductance value $G_1$, (d) an upper side band energy path connected with said non-linear capacitance and having means for transmitting said upper side band of frequency $f_3$, said upper side band energy path having a conductance value $G_3$, and (e) a lower side band energy path connected with said non-linear capacitance, and having means for transmitting said lower side band of frequency $f_2$, said lower side band energy path having a conductance value $G_2$, (f) the output amplification $V_{12}$ with respect to energy of frequency $f_2$ of said lower side band energy path in relation to the energy of the input signal oscillation of frequency $f_1$ at said signal frequency energy path having a value according to the following formula:

$$V_{12}=\frac{f_2 \cdot 4 \cdot m_{12}}{f_1 \cdot (1+m_{13}-m_{12})^2}$$

with $$m_{12}=\omega_1 \cdot \omega_2 \cdot C_V^2/(G_1 \cdot G_2)$$
$$m_{13}=\omega_1 \cdot \omega_3 \cdot C_V^2/(G_1 \cdot G_3)$$

and $$\omega_1=2\pi f_1,\ \omega_2=2\pi f_2,\ \omega_3=2\pi f_3$$

(g) said conductance values $G_1$, $G_2$ and $G_3$ each having a definite finite value greater than zero.

4. An arrangement according to claim 3 with said upper and lower sideband branch energy paths comprising a hollow conductor with rectangular cross section having said reactance modulator arranged between the broad sides of said hollow conductor, said pump frequency branch energy path comprising a coaxial conduit connecting with said reactance modulator through one broad side of said hollow conductor, said signal frequency branch energy path comprising a further coaxial conduit connecting with said reactance modulator through the other broad side of said hollow conductor, and separating means connected with the upper sideband branch energy path for blocking transmission of the lower sideband of frequency $f_2$, and separating means connected with the lower sideband branch energy path for blocking transmission of the upper side band of frequency $f_3$, said separating means comprising a first filter in said upper sideband branch energy path allowing passage to the frequency $f_3$ and having an input baffle providing a short circuit for the frequency $f_2$ and being disposed from the cross-sectional plane of said reactance modulator a distance of substantially one quarter of the wave length of the hollow conductor at frequency $f_2$, and a second filter in said lower sideband branch energy path allowing passage to the frequency $f_2$ and having an input baffle providing a short circuit for the frequency $f_3$ and being disposed a distance from said cross-sectional plane in an opposite direction in said hollow conductor substantially equal to one quarter of the wave length of the hollow conductor at frequency $f_3$.

5. An arrangement for low noise level amplification of short and ultra short electromagnetic waves, comprising (a) a reactance modulator comprising a non-linear capacitance, (b) four branch energy paths each branching from said reactance modulator in a respective different direction, said branch energy paths comprising respectively (1) a pump frequency branch energy path connected with said nonlinear capacitance and branching therefrom for supplying pump energy of a frequency $f_0$ to said non-linear capacitance, (2) a signal frequency branch energy path connected with said non-linear capacitance and branching therefrom for supplying energy of an input signal oscillation of frequency $f_1$ to said non-linear capacitance to generate a lower side band of frequency $f_2$ equal to $f_0$ minus $f_1$, and to generate an upper side band of frequency $f_3$ equal to $f_0$ plus $f_1$, (3) an upper side band branch energy path connected with said non-linear capacitance and branching therefrom and having means for transmitting said upper side band of frequency $f_3$, and (4) a lower side band branch energy path connected with said non-linear capacitance and branching therefrom and having means for transmitting said lower side band of frequency $f_2$, (c) separating means connected with the upper side band branch energy path for blocking transmission of the lower side band of frequency $f_2$, and separating means connected with the lower side band branch energy path for blocking transmission of the upper side band of frequency $f_3$, (d) the termination of said upper side band branch energy path and the termination of said lower side band branch energy path consisting essentially of respective active conductances for the respective frequencies $f_3$ and $f_2$, said active conductances each having a definite finite conductance value, and the conductance values being correlated with each other to provide a predetermined amplification at said frequency $f_3$ substantially greater than $f_3/f_1$, (e) said upper and lower side band branch energy paths comprising a hollow conductor with rectangular cross section having said reactance modulator arranged between the broad sides of said hollow conductor, said pump frequency branch energy path comprising a coaxial conduit connecting with said reactance modulator through one broad side of said hollow conductor, said signal frequency branch energy path comprising a further coaxial conduit connecting with said reactance modulator through the other broad side of said hollow conductor, said separating means comprising a first filter in said upper side band branch energy path allowing passage to the frequency $f_3$ and having an input baffle providing a short circuit for the frequency $f_2$ and being disposed from the cross-sectional plane of said reactance modulator a distance of substantially one quarter of the wave length of the hollow conductor at frequency $f_2$, and a second filter in said lower side band branch energy path allowing passage to the frequency $f_2$ and having an input baffle providing a short circuit for the frequency $f_3$ and being disposed a distance from said cross-sectional plane in an opposite direction in said hollow conductor substantially equal to one quarter of the wave length of the hollow conductor at frequency $f_3$.

6. An arrangement for low noise level amplification of short and ultra short electromagnetic waves. comprising (a) a reactance modulator comprising a non-linear capacitance, (b) a pump frequency energy path connected with said non-linear capacitance for supplying thereto pump energy of a frequency $f_0$ to provide a capacitance value of said non-linear capacitance including a constant capacitance value $C_0$, and a variable capacitance value $C_V$ varying as a function of the pump energy, (c) a signal frequency energy path connected with said non-linear capacitance for supplying energy of an input signal oscillation of frequency $f_1$ to said non-linear capacitance to generate a lower side band of frequency $f_2$ equal to $f_0$ minus $f_1$, and to generate an upper side band of frequency $f_3$ equal to $f_0$ plus $f_1$, said signal frequency energy path having a conductance value $G_1$, (d) upper and lower side band energy path means connected with said non-linear capacitance, and presenting a conductance value $G_2$ with respect to the lower side band frequency $f_2$ and presenting a conductance value $G_3$ with respect to the upper side band frequency $f_3$, (e) the output amplification $V_{12}$ with respect to energy of frequency $f_2$ in relation to the energy of the input signal oscillation of frequency $f_1$ at said signal frequency energy path having a value according to the following formula:

$$V_{12}=\frac{f_2\cdot 4\cdot m_{12}}{f_1\cdot(1+m_{13}-m_{12})^2}$$

with $$m_{12}=\omega_1\cdot\omega_2\cdot C_V^2/(G_1\cdot G_2)$$

$$m_{13}=\omega_1\cdot\omega_3\cdot C_V^2/(G_1\cdot G_3)$$

and $$\omega_1=2\pi f_1,\ \omega_2=2\pi f_2,\ \omega_3=2\pi f_3$$

7. An arrangement according to claim 6 with said conductance values $G_1$, $G_2$ and $G_3$ being such as to provide a predetermined value of said output amplification $V_{12}$, and being such that $m_{13}-m_{12}$ is greater than $-1$, thereby insuring stability of operation at said predetermined value of amplification.

(f) said conductance values $G_1$, $G_2$ and $G_3$ each having a definite substantial finite value greater than zero.

8. An arrangement for low noise level amplification of short and ultra short electromagnetic waves, comprising (a) a reactance modulator comprising a non-linear capacitance, (b) a pump frequency energy path connected with said non-linear capacitance for supplying thereto pump energy of a frequency $f_0$ to provide a capacitance value of said non-linear capacitance including a constant capacitance value $C_0$, and a variable capacitance value $C_V$ varying as a function of the pump energy, (c) a signal frequency energy path connected with said non-linear capacitance for supplying energy of an input signal oscillation of frequency $f_1$ to said non-linear capacitance to generate a lower side band of frequency $f_2$ equal to $f_0$ minus $f_1$, and to generate an upper side band of frequency $f_3$ equal to $f_0$ plus $f_1$, said signal frequency energy path having a conductance value $G_1$, (d) upper and lower side band energy path means connected with said non-linear capacitance, and presenting a conductance value $G_2$ with respect to the lower side band frequency $f_2$ and presenting a conductance value $G_3$ with respect to the upper side band frequency $f_3$, (e) the output amplification $V_{13}$ with respect to energy of frequency $f_3$ of said upper side band energy path in relation to the energy of the input signal oscillation of frequency $f_1$ at said signal frequency energy path having a value according to the following formula:

$$V_{13}=\frac{f_3\cdot 4\cdot m_{13}}{f_1\cdot(1+m_{13}-m_{12})^2}$$

with $$m_{12}=\omega_1\cdot\omega_2\cdot C_V^2/(G_1\cdot G_2)$$

$$m_{13}=\omega_1\cdot\omega_3\cdot C_V^2/(G_1\cdot G_3)$$

and $$\omega_1=2\pi f_1,\ \omega_2=2\pi f_2,\ \omega_3=2\pi f_3$$

(f) said conductance values $G_1$, $G_2$ and $G_3$ each having a definite substantial finite value greater than zero.

9. An arrangement according to claim 8 with said upper and lower side band energy path means comprising a side band energy path having one of said conductance values $G_2$ and $G_3$ terminating the same with respect to the corresponding one of said side band frequencies and having a frequency selective transforming device serving for the frequency selective transformation thereof with respect to the other of said side band frequencies, to provide said conductance values $G_2$ and $G_3$ and to provide a value of said amplification $V_{13}$ substantially greater than $f_3/f_1$.

References Cited

UNITED STATES PATENTS 3,040,267 6/1962 Seidel ---------------- 330—5

OTHER REFERENCES

Olson et al., "Proceedings of the IRE," April 1959, pp. 587–588.

Rowe, "Proceedings of the IRE," May 1958, pp. 850–860.

JOHN KOMINSKI, Primary Examiner

D. R. HOSTETTER, Assistant Examiner

U.S. Cl. X.R.

330—4.9